(12) United States Patent
Eberhart et al.

(10) Patent No.: US 8,238,924 B2
(45) Date of Patent: Aug. 7, 2012

(54) REAL-TIME OPTIMIZATION OF ALLOCATION OF RESOURCES

(75) Inventors: Russell C. Eberhart, Indianapolis, IN (US); Xiaohui Hu, Indianapolis, IN (US); Patrick J. Shaffer, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 270 days.

(21) Appl. No.: 12/771,912

(22) Filed: Apr. 30, 2010

(65) Prior Publication Data

US 2011/0269491 A1 Nov. 3, 2011

(51) Int. Cl.
*H04W 72/00* (2009.01)
(52) U.S. Cl. ........................... 455/450; 455/418
(58) Field of Classification Search ............... 455/101, 455/509, 450, 451, 67.11
See application file for complete search history.

(56) References Cited

U.S. PATENT DOCUMENTS

| | | | |
|---|---|---|---|
| 4,870,408 A | 9/1989 | Zdunek et al. | |
| 5,020,141 A | 5/1991 | Meszko | |
| 5,193,197 A | 3/1993 | Thacker | |
| 5,862,485 A | 1/1999 | Linneweh, Jr. et al. | |
| 6,191,727 B1 | 2/2001 | Springer et al. | |
| 6,484,145 B1 | 11/2002 | Horne et al. | |
| 6,553,006 B1 | 4/2003 | Kalliokulju et al. | |
| 6,561,992 B1 | 5/2003 | Eberhart et al. | |
| 6,564,066 B1 | 5/2003 | Rule et al. | |
| 7,403,575 B2 * | 7/2008 | Gehring et al. ............... 375/308 | |
| 2006/0114826 A1 | 6/2006 | Brommer | |
| 2007/0038751 A1 | 2/2007 | Jorgensen | |
| 2007/0060150 A1 | 3/2007 | Hart | |
| 2008/0233883 A1 | 9/2008 | Ibrahim et al. | |
| 2009/0003266 A1 | 1/2009 | Stolyar et al. | |
| 2009/0010205 A1 | 1/2009 | Pratt et al. | |
| 2009/0147723 A1 | 6/2009 | Fang et al. | |
| 2009/0161543 A1 | 6/2009 | Beadle | |
| 2009/0170506 A1 | 7/2009 | Hirsch | |
| 2009/0219856 A1 | 9/2009 | Richardson et al. | |
| 2010/0030711 A1 | 2/2010 | Eberhart et al. | |

FOREIGN PATENT DOCUMENTS

JP 2008118521 5/2008

OTHER PUBLICATIONS

Tse, et al., Multi-Access Fading Channels. I. Polymatroid Structure, Optimal Resource, IEEE Transactions on Information Theory (1998).
Lee, et al., An adaptive resource allocation mechanism including fast and reliable handoff in IP-based 3G wireless networks, IEEE Personal Communications, vol. 7, No. 6 (2000).
Zhou, et al., Allocation of radio resources to packet switched traffic in GPRS-like networks, Aalborg University (2004).

(Continued)

*Primary Examiner* — Tu X Nguyen
(74) *Attorney, Agent, or Firm* — Christopher A Monsey (57) ABSTRACT

Embodiments of a system and a method for assigning a plurality of resources to a plurality of targets in near real-time are described herein. An evolutionary algorithm such as a particle swarm algorithm iteratively evaluates a predetermined fitness function characteristic of a system including the plurality of resources to find solutions containing optimal resource assignments. Resource parameters are changed based on the assignments to operate on the targets.

28 Claims, 9 Drawing Sheets

OTHER PUBLICATIONS

Fontaine, Wireless Planning in Health Care, Annual Review of Wireless Communications, International Engineering Consortium, 5 pp. (2006).

Harrington, et al., Software-Defined Radio, The Revolution of Wireless Communication, Annual Review of Wireless Communications, International Engineering Consortium, 15 pp. (2006).

Nissen, et al., A Technology-Enabled Framework for Dynamic Allocation of the Radio-Frequency Spectrum, Annual Review of Wireless Communications, International Engineering Consortium, 8 pp. (2006).

Gutierrez, et al., Contiguous frequency-time resource allocation and scheduling for wireless OFDMA systems with QoS support, EURASIP Journal on Wireless Communications and Networking (2009).

Eberhart, et al., Particle Swarm Optimization, Computational Intelligence: Concepts to Implementations, pp. 87-94 (2007).

Eberhart, et al., Chapter Four, Evolutionary Computation Implementations, Computational Intelligence: Concepts to Implementations, pp. 95-143 (2007).

Eberhart, et al., The Particle Swarm and Collective Intelligence, Swarm Intelligence, 106 pp. (2001).

Bertoli, et al., Convergence of EW capabilities: designing the next generation electronic attack (EA) system, Phoenix Challenge Conference (2008).

Hu, et al., Human vs. Swarm: An NK landscape game; Proc. IEEE Swarm Intelligence Symposium, IEEE Service Center, Piscataway, NJ. (2008).

Pan, et al., A new UAV assignment model based on PSO, Proc. IEEE Swarm Intelligence Symposium, IEEE Service Center, Piscataway, NJ. (2008).

\* cited by examiner

REAL-TIME OPTIMIZATION OF ALLOCATION OF RESOURCES

RESEARCH OR DEVELOPMENT

The invention described herein was made in the performance of official duties by an employee of the Department of the Navy and may be manufactured, used, licensed by or for the United States Government for any governmental purpose without payment of any royalties thereon.

FIELD OF THE INVENTION

The invention relates generally to methods for real-time allocation of resources. In particular, the invention relates to methods and systems for optimizing the allocation of resources using evolutionary algorithms.

BACKGROUND

An electromagnetic (EM) transceiver system can be thought of as having a front-end for receiving and transmitting signals within an EM spectrum and a back-end for generating instructions for the front-end and for analyzing the signals. The front-end may comprise a plurality of EM resources such as receivers, transmitters, and transceivers which transmit or receive as instructed. Radio frequency is a subset of the electromagnetic spectrum which includes infrared, visible, and ultraviolet light. EM resources are constrained by their power capacity and may comprise additional constraints such as filtering capabilities and so on. Transceivers may have a plurality of selectable channels, each channel optionally including a matched filter and amplifier, that are switched in and out.

EM systems such as communications systems have utility in medical environments, telecommunications environments, emergency response systems, military environments, and in any other environments in which multiple transceivers may communicate simultaneously in a common signals space. Such systems dynamically allocate narrow bands of the space to maximize the amount of signal traffic to respond to changes in the number and types of signals. The narrow bands are often described as communication channels. Allocations may also change to give certain signals priority over others, to preserve some bands for emergency responders, to mitigate interference between signals, based on the capacity of each resource, and for many other reasons.

Traditional resource assignment or allocation methods are limited. Methods that allocate resources to preserve a portion of the signal space for priority calls underutilize the preserved space. Methods that assign channels on a first-come-first-served basis and maintain the channels until traffic in the channels ends, at which time the channels may be re-assigned, may under-serve priority signals. New methods are needed which assign resources to maximize a desired response function on a near real-time basis.

SUMMARY

Embodiments of a system and a method for assigning a plurality of resources to a plurality of targets in near real-time are described herein. In one embodiment, a storage medium is provided which is operable by a processing device to dynamically assign a plurality of resources to a plurality of targets. The storage medium comprises first, second, third, fourth, fifth and sixth processing sequences, and a data structure comprising a plurality of particle data corresponding to a particle population, each particle data including a velocity and a position of a particle of the particle population. The first processing sequence receives target information representing characteristics of the plurality of targets and stores the information in the storage medium. The second processing sequence updates the plurality of particle data according to a predetermined formula and generates a plurality of fitness values based on the information. The plurality of fitness values correspond to a plurality of potential solutions. The third processing sequence iteratively invokes the second processing sequence to improve the plurality of potential solutions by comparing fitness values in preceding and succeeding iterations. The fourth processing sequence defines a decision criterion to select from the improved plurality of solutions a best solution which satisfies the decision criterion, the best solution from the improved plurality of solutions comprising assignments for the plurality of resources. The fifth processing sequence communicates the assignments to the plurality of resources when the storage medium is communicatively coupled to the processing device and the plurality of resources. The sixth processing sequence invokes the third processing sequence independently at least twice thereby generating at least a first best solution and a second best solution corresponding to a first particle population and a second particle population. The fourth processing sequence selects an overall best solution from at least the first best solution and the second best solution. The first, second, third, fourth, fifth and sixth processing sequences are operable to receive the target information, select an overall best solution and communicate the assignments at least once each second.

BRIEF DESCRIPTION OF THE DRAWINGS

The above-mentioned and other disclosed features, and the manner of attaining them, will become more apparent and will be better understood by reference to the following description of disclosed embodiments of the invention taken in conjunction with the accompanying drawings, wherein.

DETAILED DESCRIPTION

For the purposes of promoting an understanding of the principles of the invention, reference will now be made to the embodiments of the invention illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Embodiments of a system and a method for assigning resources to targets are described herein. A plurality of resources may be assigned to a plurality of targets in near real-time. The method is particularly useful in applications where assignments must change rapidly to respond to changing targets. Many applications of the method are possible. For example, narrow-band receivers may be assigned to target sets of signals presented by a wide-band system in an electronic support environment. Overriding resources may be assigned to multiple targets in an electronic attack environment. Frequencies may be assigned in software-defined and cognitive radio systems to minimize or avoid interference. Network resources may be assigned to define a network topology that maximizes the throughput of the network. Surveillance equipment, e.g. cameras, motion detectors and the like, may be assigned to predetermined areas to maximize the likelihood of identifying a moving target.

In one embodiment, the resource assignment system comprises an EM system. The EM system scanning the EM spectrum to detect signals therein, uses an evolutionary algorithm to optimize a fitness function based on parameters of the detected signals and constraints of the EM resources, and then assigns center-frequencies to the EM resources. The scanning, optimizing and assigning steps can be performed in near real-time due to the effectiveness of the evolutionary algorithm in finding suitable solutions. The topography of the EM system can vary with the capabilities of the transceivers. On one end of the spectrum are centralized systems in which transceivers mostly perform front-end functions concerning the physical transmission of signals and in which separate subsystems are provided to perform back-end functions. Such a system is described further below with reference to FIG. 1.

Figure 1:
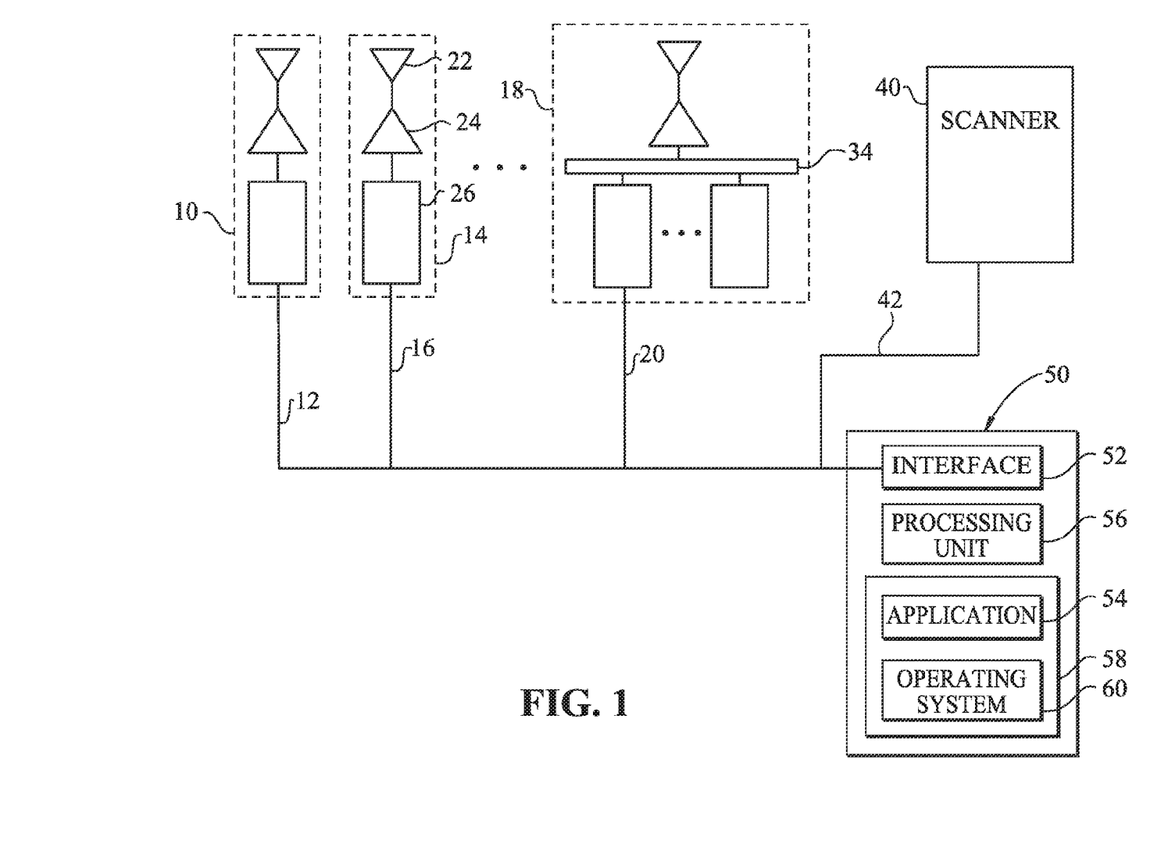
FIG. 1 is a block diagram illustrating an EM system.

The resource assignment system depicted in FIG. 1 comprises EM resources 10, 14 and 18. An exemplary EM resource includes antenna 22, amplifier 24 and a transceiver, illustratively transceiver 26. EM resource 18 represents a banded subsystem architecture where multiple transceivers feed into banded amplifier 34. Any suitable antenna and amplifier may be utilized. The EM resources may be co-located or geographically distributed. For example, EM resources may be stationary and also mobile, e.g., located on vehicles. The EM resources may be allowed to overlap coverage. In the embodiment shown in FIG. 1 the EM system also includes scanner 40 and a back-end subsystem, illustratively subsystem 50 comprising interface 52, processing unit 56, memory 58, operating system 60, and application(s) 54. The back-end subsystem calculates resource assignments and may comprise dedicated hardware having specialized functionality, computers having software configured to perform the back-end functions, and a combination of hardware and software implementations. Signal information may be communicated by any means such as a communications bus, exemplified as line 42. Scanner 40 may comprise a plurality of scanners, including wide band scanners, and is not intended to limit the invention to use of a single scanner. Scanner 40 periodically scans the frequency spectrum and provides to interface 52 information about the detected signals. Interface 52 is communicatively coupled to EM resources 10, 14 and 18 through communication lines 12, 16 and 20 which may be directly coupled or may represent portions of a communications bus.

On the other end of the spectrum are distributed systems in which transceivers comprise computer programs, e.g. firmware or software and are capable of performing back-end as well as front-end functions. In a distributed system, one or more transceivers may scan the frequency spectrum before engaging the signals therein. Scanning is performed with suitably narrow frequency bands therefore the transceivers do not saturate. Advantageously, scanning may be performed by a scanner during off-times, for instance when a signal of interest disappears before the EM resources are reassigned. A communications bus may provide signal priorities and other information, including the location and characteristics of signals of interest. Such information is combined with scanning results by the programming of the transceivers.

Figure 2:
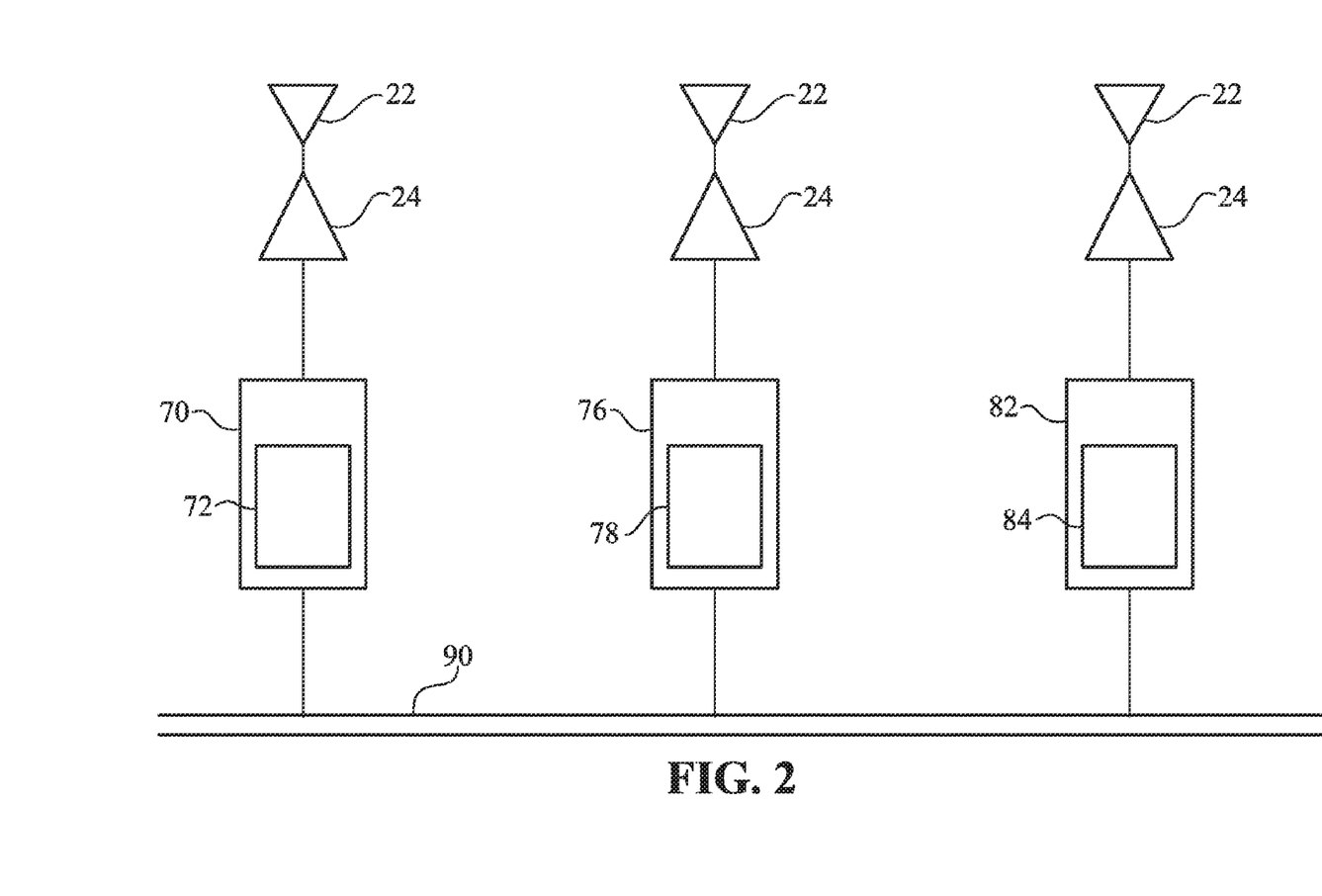
FIG. 2 is a block diagram illustrating an alternative EM system.

An embodiment of a distributed resource assignment system is depicted in FIG. 2. Illustrated therein are a plurality of transceivers 70, 76 and 82 having computer programs, respectively programs 72, 78 and 84, communicatively coupled to communications bus 90. Programs 72, 78 and 84 may comprise firmware, software or a combination of both. Known components of any processing system needed to execute programming are included but not shown. Such components include a processor, memory in which programming is accessed by processors and suitable communications interfaces to access communications bus 90. Advantageously, the overall performance of the system can be optimized by sharing back-end operations among transceivers 72, 76 and 84 and any other device communicatively coupled to communications bus 90. For example, scanner 42 and subsystem 50 may also be coupled to communications bus 90 permanently or as they become available.

Generally, an evolutionary algorithm seeks solutions iteratively by improving on the solutions obtained in prior iterations based on the fitness or quality of the solutions. The evolutionary algorithm selects from multiple solutions a "best" solution and improves on it in subsequent iterations until a solution meets criteria indicating that the solution is adequate or optimal. Competing independent evolutionary processes may be initiated to seek solutions faster. An exemplary evolutionary algorithm is a particle swarm optimization (PSO) or "swarm" algorithm. Unless stated otherwise, the term "swarm algorithm" refers generally to algorithms based on swarm intelligence regardless of the number of swarm populations used to calculate results.

In an EM system, each solution includes the center-frequencies of the EM resources. The EM system rapidly seeks to achieve a best fit application of EM resources based in part upon the physical constraints of the system. In one embodiment, the fitness function seeks to optimize performance relative to high priority signals. A fitness value determines how well the solution satisfies the response function, including any constraints. Priorities are provided to the system and may be based on information about detected signals such frequency, modulation characteristics, and power. Priorities may also be programmed into the back-end subsystem. The fitness function may weigh the importance of receiving a signal, the importance of overriding it, the importance of transmitting it relative to the importance of performing these functions on other signals. After the evolutionary algorithm finds the solution(s), the EM system then assigns the center-frequencies to the EM resources. In other embodiments, fitness functions may be designed to find solutions which assign resources to cover the highest number of high priority signals, solutions which cover the most high and medium priority signals even if some high priority signals are not covered, solutions which allocate EM resources while avoiding certain frequencies, and the like.

Advantageously, swarm algorithms provide rapid solutions enabling frequent re-scanning of the frequency spectrum to detect signals that may be present at particular frequencies for short time intervals. Consequently, EM resources may be re-allocated rapidly and frequently to improve the overall performance of the EM system. Even more advantageously, the swarm algorithm enables the allocation of resources in spite of the presence of non-linearities, discontinuities, and noise. The swarm algorithm may also achieve success in scenarios where multiple optima exist.

The swarm algorithm uses swarm intelligence, which is defined as the adaptive behavior of a population of simple computational entities that interact either directly or indirectly. Swarm-intelligent systems rapidly solve problems, converging or clustering in highly nonlinear and dynamic problem spaces. The swarm algorithm performs several computational steps which will be described for the case of a single swarm population. First, a population of random solutions is initialized. A solution in the EM system comprises different combinations of receiver or overriding resources, i.e., a series of random numbers representing the center-frequencies of different receiver or overriding resources. Second, the fitness value of each member of the population of solutions is calculated. Third, the group of potential solutions is improved. Each potential solution is treated as a particle of the swarm population. Each particle has several attributes: velocity, which represents rate of change of the solution; personal best, which represents the location of the particle in the search space when it achieved the best result thus far; and neighborhood best, which represents the location in search space of the best result achieved by a defined topological neighborhood around each particle. During each iteration, the personal best and neighborhood best are updated based on the new fitness values and then the velocity and the new potential solution are calculated based on the following equations:

$$V_{id} = w \times V_{id} + c_1 \times \text{rand}(\ ) \times (p_{id} - x_{id}) + c_2 \times \text{Rand}(\ ) \times (p_{nd} - x_{id}) \quad (1)$$

$$x_{id} = x_{id} + V_{id} \quad (2)$$

Equation (1) calculates a new velocity for each particle (potential solution) based on its previous velocity ($V_{id}$), the particle's location at which the best fitness has been achieved ($p_{id}$, or pBest) so far, and the location of the best particle among the neighbors ($p_{nd}$, or nBest) at which the best fitness has been achieved so far. Equation (2) updates each particle's position in the solution hyperspace. The two random numbers (rand( ) and Rand( )) (between 0 and 1) are independently generated. $c_1$ and $c_2$ are two learning factors, usually set at values between 1.0 and 2.0. The use of the inertia weight w, which often has values between 0.4 and 1.1, has provided improved performance. Another form of the inertia weight is $$\frac{Rand}{2} + 0.5,$$

which is useful in dynamic (changing) and complex environments. If the best solution in the group (population) meets the requirements, the algorithm stops and presents the results. Otherwise the algorithm recycles. An implementation procedure for executing a PSO algorithm is described in Chapter 4 of the book titled "Computational Intelligence: Concepts to Implementations" authored by Russell Eberhart and Y. Shi, Morgan Kaufmann Publishers (2007), which is incorporated by reference herein.

TA gaming PSO algorithm uses two (or more) separate PSO optimization processes (swarms) to optimize the same function independently. The results are compared with each other, and the optimization stops when both (or a majority, or all, in case of more than two) of them reach the same results. Population sizes of the individual gaming PSO swarms can be, and typically are, smaller than those usually utilized for single swarm PSO. The competing particle populations improve performance compared to the single particle population algorithm, finding the optimal solution more than twice as fast and typically between three and five times as fast. The speed reflects that solutions are found with fewer computations even though more swarms are used which results from fewer iterations and, possibly though not necessarily, from smaller swarm sizes.

Figure 3:
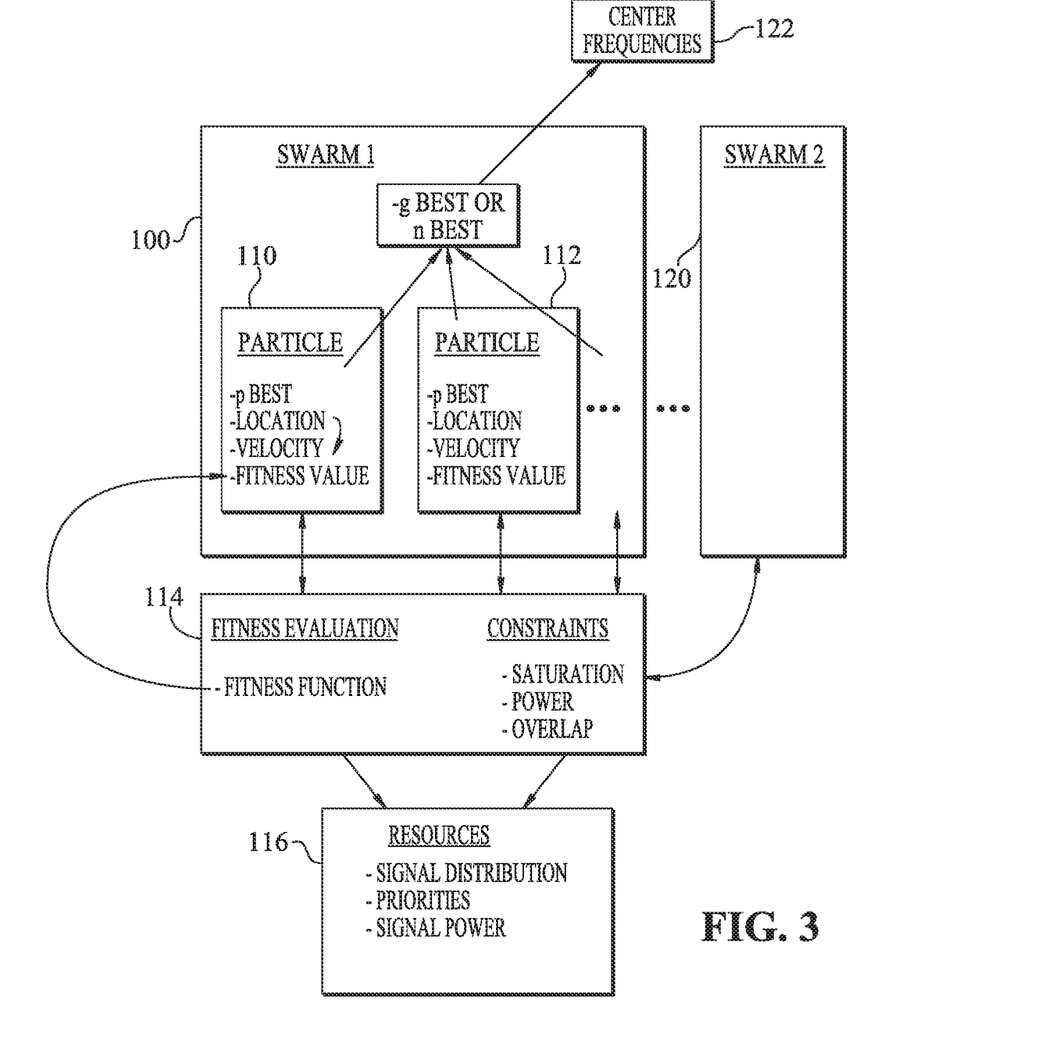
FIG. 3 is a block diagram illustrating data structures corresponding to a gaming particle swarm algorithm applicable in the EM systems of FIGS. 1 and 2.

Data structures of a typical PSO algorithm are shown in FIG. 3. A typical swarm, denoted by numeral 100, and two exemplary particles, particles 110 and 112, are shown to illustrate the relative structures. A typical swarm will have between 30 and 50 particles. A typical swarm in a gaming PSO algorithm may have between 10 and 50 particles, and preferably between 10 and 30 particles. A gaming algorithm will have two or more swarms. Also shown is the relative organization of a second swarm, illustratively swarm 120. The internal structure of swarm 120 is the same as shown with reference to swarm 100. A particle data structure comprises location and velocity, which are linked and change with each iteration, fitness value, which is the value obtained at the present location, and pbest, which is the best potential solution calculated for the particle by comparing the present potential solution and previous pbest. The best pbest value of all the particles is gbest or nbest as the case might be.

The data structure of the resource assignment system, denoted by numeral 114, includes constraints and the fitness evaluation. The fitness evaluation includes, for the systems described in FIGS. 1 and 2, a function defining the objective of the system and potential center-frequencies and bandwidth of the resources. The center-frequencies of each resource, together, are calculated for each potential solution of each particle. The combined result is evaluated to provide a fitness value to each particle. The constraints may include saturation, in the case of overriding, or total power, in the case where the transceiver is receiving signals, and may also include permitted resource bandwidth overlap. The fitness evaluation and the constraints are defined for each system. A network, for example, will have different constraints based on its topography, and different fitness evaluation based on the objectives of that system.

Inputs of the resource assignment system, denoted by numeral 116, include the signal distribution and power obtained by scanning the spectrum, and the signal priorities. Outputs of the resource assignment system, denoted by numeral 122, are the center-frequencies, in gbest, that should be assigned to the resources. It should be apparent even to a casual observer that the data structures described above represent an exemplary EM resource system. Alternative resource system will have alternative inputs, outputs, fitness evaluation and constraints.

Figure 4:
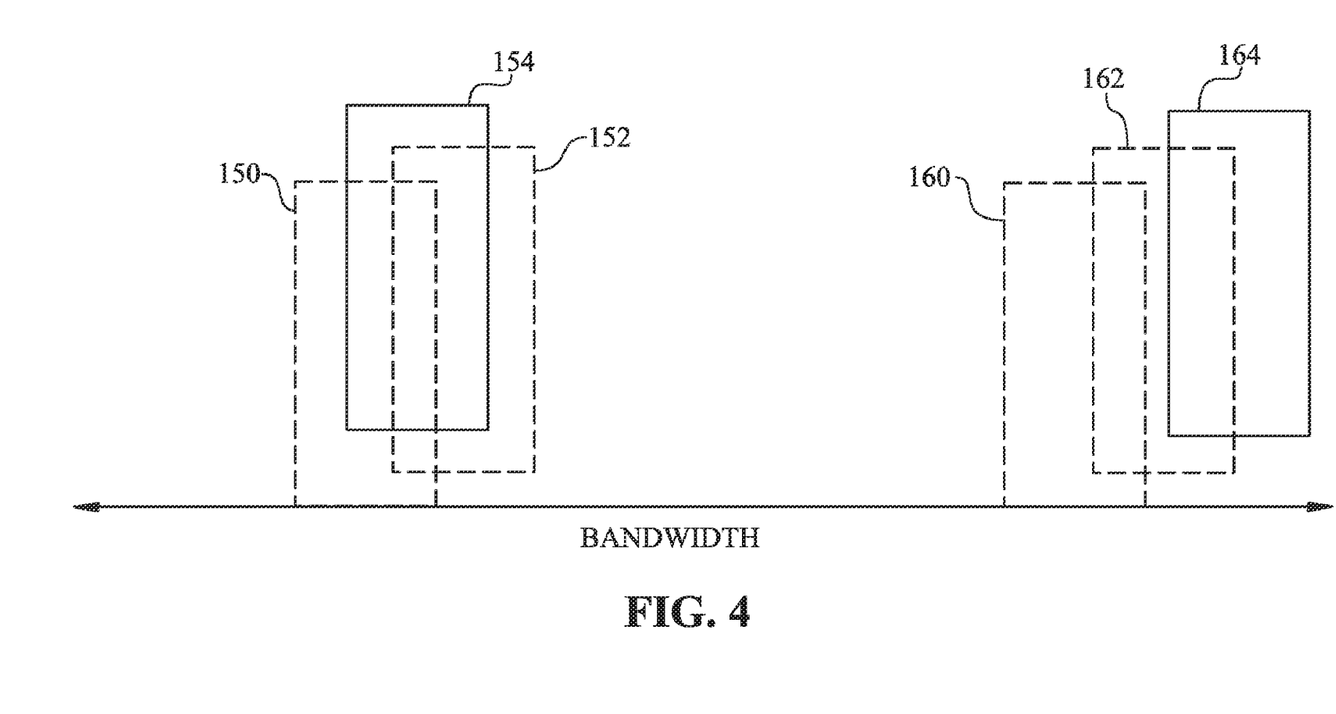
FIG. 4 is a graph illustrating movements of EM resource center-frequencies corresponding to movements of particle swarms in the particle swarm algorithm depicted with reference to FIG. 3.

A demonstrative bar graph of the PSO process is shown in FIG. 4 to illustrate its effect on center-frequency assignments. Only two resources are shown, and only the results from one swarm are shown. To improve clarity, the vertical position of the bars was increased after each iteration. Each bar shows the total bandwidth or spectrum in which the resources will be allocated. The centers of dashed bars 150 and 160 represent the center-frequencies provided by gbest after the first iteration. The centers of dashed bars 152 and 162 represent the center-frequencies provided by gbest after the second iteration. The depiction illustrates that the direction of the center-frequencies of each resource for each gbest do not have to be the same. The point is further illustrated by centers of dashed bars 154 and 164 which represent the center-frequencies of the final gbest.

Figure 5:
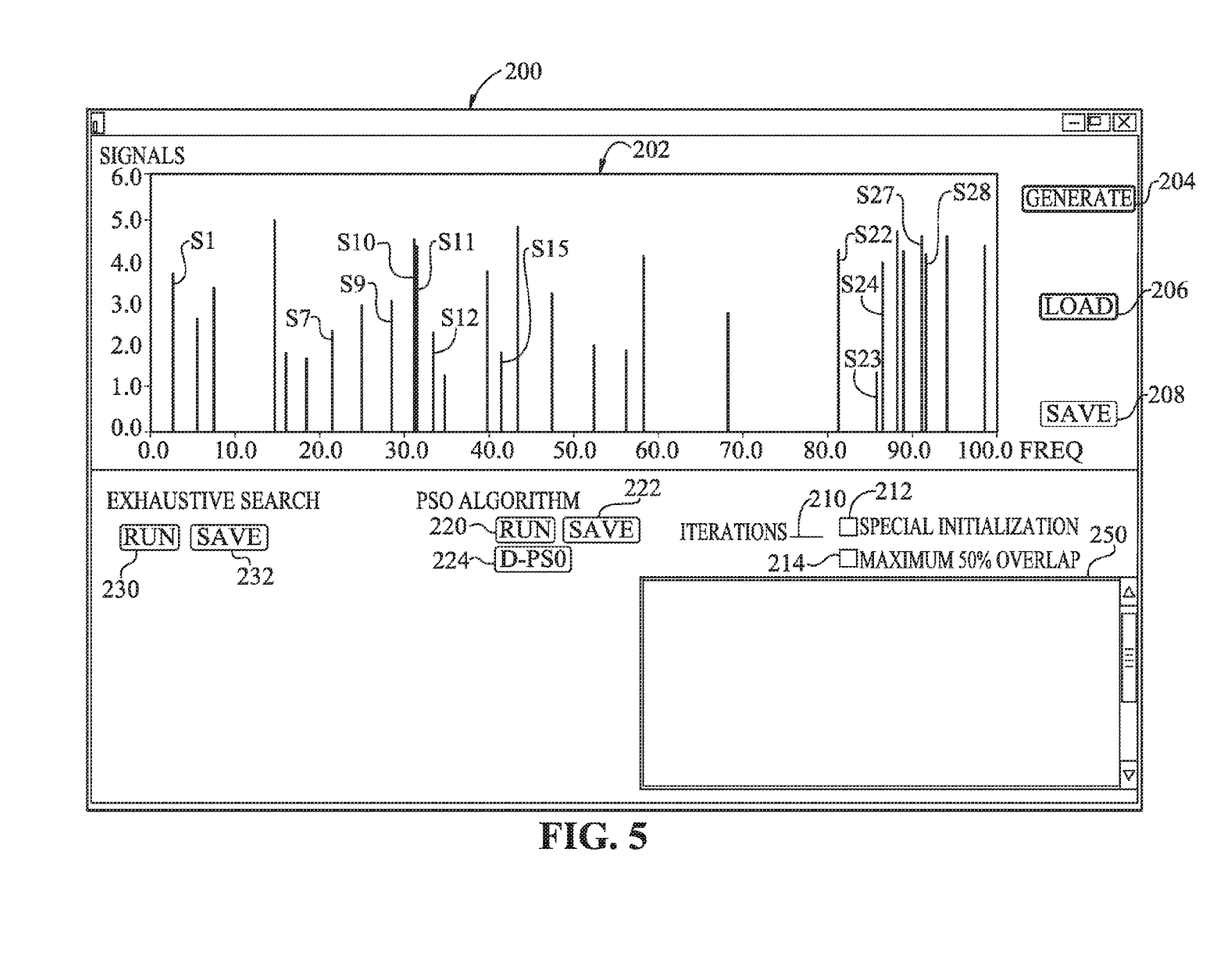
FIG. 5 is a GIU image illustrating target signals in a frequency band.
Figure 6:
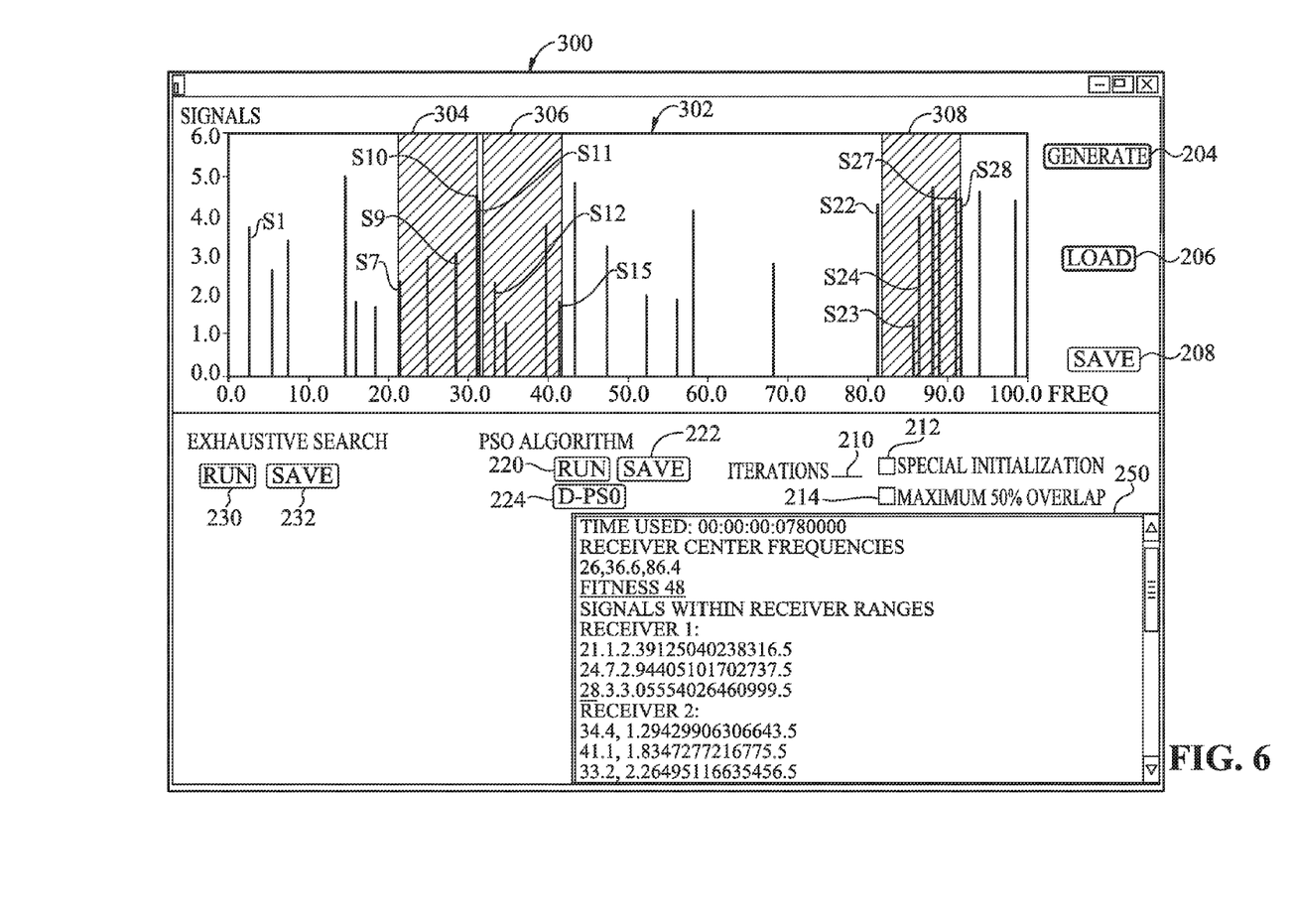
FIGS. 6 and 7 are screenshots illustrating the allocation of EM resources to the target signals depicted in FIG. 5 with a particle swarm algorithm.
Figure 7:
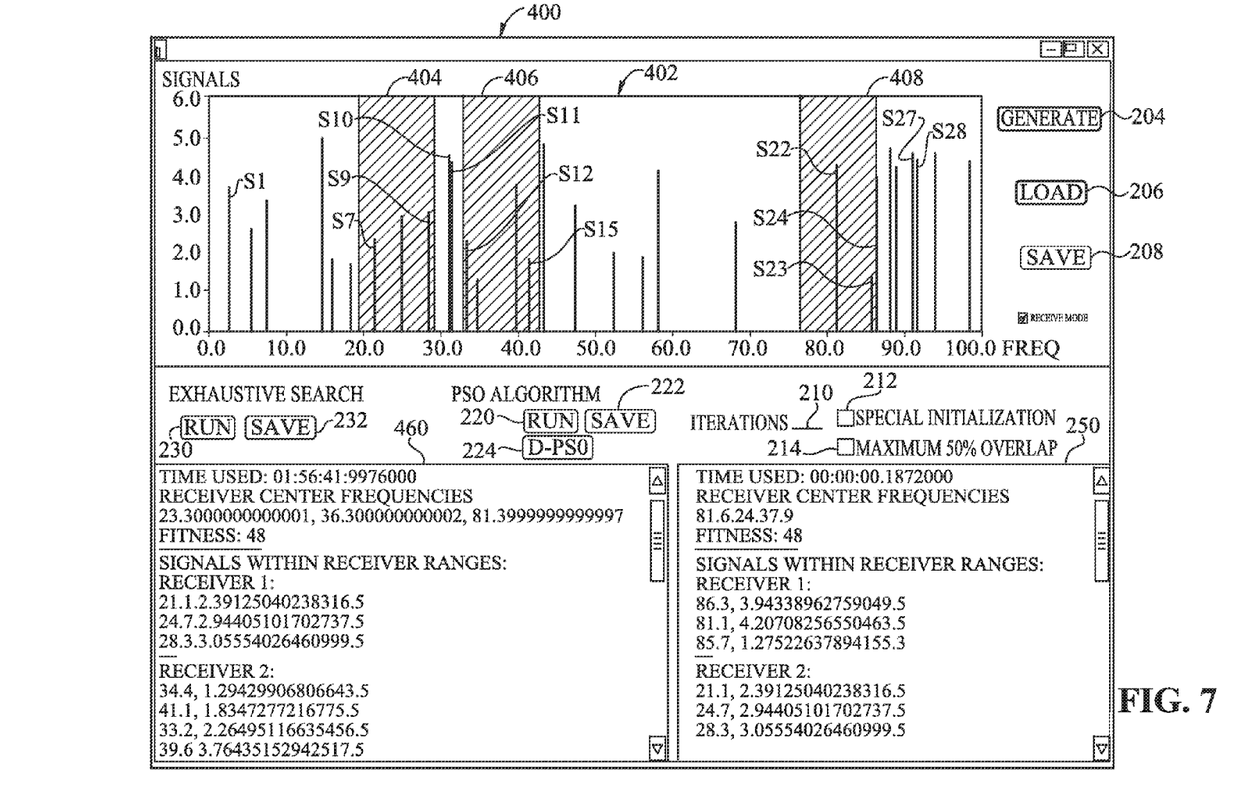

An EM resource assignment simulation will now be described to illustrate how the EM systems of FIGS. 1 and 2 can be integrated with the data structures of FIG. 3. FIGS. 5, 6 and 7 illustrate a graphical user interface including graphs 202, 302 and 402 shown in screen-shots 200, 300 and 400, respectively. The simulation generates representative signals whose characteristics are listed in Table 1 below. In the simulation, the frequency spectrum was defined to be 100 units wide. The EM resources were defined to be tunable with a resolution of 0.1 unit and to have a bandwidth of 10 units. Under these constraints, there are 1,000 total frequency settings possible for the system and the maximum total coverage is 30 percent of the wider spectrum if EM resources are not allowed to overlap. Each representative signal has a power (e.g., power needed to override or power of the received signal), and a priority. In the simulation, 90% of the signals were distributed randomly in three sub-bands of the wide spectrum (2-6, 20-60, or 80-100). Powers and priorities were assigned randomly, with powers ranging continuously from 1-5 and priorities selected as low, medium or high.

In an actual application, the representative signals will be obtained by scanning the frequency spectrum to present targets to the resource assignment system. In one embodiment, the signals are captured, digitized and recorded, and subsequently or concurrently reverse engineered to obtain signal characteristics such as operational frequencies, channel spacing, power output, and channel usage. Signal modulation may be determined, and if digital, a data byte stream and encoding protocol may also be obtained. The signal characteristics are then provided to an evolutionary algorithm which seeks to find a transceiver allocation solution for effectively assigning center-frequencies to a plurality of transceivers to receive or override signals. Vulnerabilities in the protocol may be exploited and instructions for exploiting the vulnerabilities may also be encoded in the fitness function.

Programming enables selection of configuration parameters which will be described below. In operation, the swarm algorithm selects center-frequencies for EM resources. The centers of frequency bands 304, 306 and 308 in FIG. 6 represent the center-frequencies obtained by the swarm algorithm based on the characteristics of an EM system for overriding signals. Similarly, the centers of frequency bands 404, 406 and 408 in FIG. 7 represent the center-frequencies obtained by the swarm algorithm based on another set of characteristics for an EM system for receiving signals.

Screen-shots 200, 300 and 400 also illustrate a number of screen objects. Button 204 is provided to generate a simulated set of signals, or targets, which in the case of a simulation are randomly generated or generated randomly with constraints. Button 206 loads a previously generated set of targets. Button 208 saves the set of targets. Buttons 230 and 232 are provided to initiate an exhaustive search and save its results. An exhaustive search provides comparative data to evaluate the performance of the swarm algorithm. Buttons 220 and 224 are provided to selectively run single and dual population swarm algorithms based on the number of iterations selected by entering an integer value at input 210. A dual population swarm algorithm is a special case of the gaming swarm algorithm. In an alternative embodiment (not shown), more than two populations may be chosen from a selection box or entering a number representing the number of populations which will compete and "vote" on a selection. Generally, the size of each swarm population is decreased as the number of populations are increased. Referring again to the shown screen-shots, button 222 saves the results. Checkboxes 212 and 214 enable a user to select special initialization parameters for the particle swarms (rather than random initial values) and to limit resource bandwidth overlap to 50%. Selecting special initialization causes the swarm algorithm to apply special information about the system to the initialization step. In one embodiment, the special information corresponds to the location of three randomly selected signals, where the resources are centered on the selected signals to avoid initializing the algorithm at resource locations where there are no signals. Text boxes 250 and 460 show the results of the simulation. Table 1 describes characteristics of the signals, generated from a simulation, labeled S1-S30. The simulation parameters described above are adequate to demonstrate the near real-time performance of the swarm algorithm compared to the much slower performance of an exhaustive search performed with a greedy algorithm. Other parameters may also be provided such as greater number of swarms, different initialization criteria etc.

TABLE 1

| Signal | Frequency | Power | Priority |
|---|---|---|---|
| S1 | 2.50 | 3.80 | 2 |
| S2 | 5.00 | 2.70 | 3 |
| S3 | 7.00 | 3.50 | 2 |
| S4 | 14.25 | 5.00 | 3 |
| S5 | 15.50 | 1.80 | 3 |
| S6 | 17.75 | 1.65 | 3 |
| S7 | 21.10 | 2.39 | 1 |
| S8 | 24.70 | 2.94 | 1 |
| S9 | 28.30 | 3.06 | 1 |
| S10 | 31.00 | 4.50 | 3 |
| S11 | 31.25 | 4.35 | 3 |
| S12 | 33.20 | 2.26 | 1 |
| S13 | 34.40 | 1.29 | 1 |
| S14 | 39.80 | 3.80 | 1 |
| S15 | 41.25 | 1.83 | 1 |
| S16 | 43.00 | 4.90 | 1 |
| S17 | 46.75 | 3.20 | 2 |
| S18 | 52.50 | 2.00 | 1 |
| S19 | 55.75 | 1.90 | 3 |
| S20 | 57.50 | 4.05 | 3 |
| S21 | 58.25 | 2.80 | 3 |
| S22 | 81.25 | 4.20 | 1 |
| S23 | 85.75 | 1.30 | 2 |
| S24 | 86.50 | 3.95 | 1 |
| S25 | 88.25 | 4.75 | 3 |
| S26 | 89.00 | 4.15 | 2 |
| S27 | 91.00 | 4.50 | 1 |
| S28 | 91.25 | 4.15 | 1 |
| S29 | 93.50 | 4.50 | 3 |
| S30 | 97.50 | 4.35 | 1 |

A method for assigning resources to targets is described below with reference to FIG. 4. Results of an embodiment of the method, applied in the simulation to the signals described in Table 1, are shown in FIGS. 6 and 7. Generally, the method comprises inputting resource constraints and selecting a fitness function, a swarm algorithm, and a number of iterations which the algorithm will perform unless it reaches a solution before reaching the selected number of iterations. With the configuration selected, the swarm algorithm identifies resource assignments based on the fitness function selected for the system and inputs at any given time. In the EM system shown, assignments comprise selection of center-frequencies.

Text box 250, shown in FIGS. 6 and 7, shows the times required to obtain solutions with a gaming PSO algorithm. Text box 460 shows comparative times for finding a solution having the same value. As shown in FIG. 6, an overriding solution with an optimal value of 48 obtained with the gaming PSO algorithm was found in 78 milliseconds. FIG. 7 shows a receiving solution with an optimal value of 48 was obtained with the gaming PSO algorithm in 187 milliseconds. The times required to calculate the optimal fitness values using a greedy algorithm and exhaustive search were 4,413 seconds for overriding and 7,002 seconds for receiving (shown as 1:56:41:9976 in FIG. 8). Both algorithms were executed on a laptop PC. The exhaustive search algorithm was programmed in C# and optimized for speed of execution. These examples are typical of results obtained over thousands of runs. For example, overriding solutions were found as quickly as 32 milliseconds but occasionally required about 180 milliseconds. Because of the variations in ways the signals are presented and varying probability distributions, statistical measures such as means and variances may not be meaningful. An optimal overriding or receiving solution is found approximately 95 percent of the time; the suboptimal solutions are generally within 10 percent of the optimal fitness value.

Referring again to FIG. 6, the EM resource center-frequencies which maximize a selected fitness function are 26.0, 36.6 and 86.4. The fitness function was selected to simulate overriding resources. It is the sum of the priorities of signals within the bandwidths of the three resources. The fitness function is constrained by the bandwidth of the resources, which are permitted to overlap and each is limited to a total power value of 10. Further, the overriding fitness function causes the swarm algorithm to select the highest priority signal with the lowest power first, then the next highest priority signal and so on. The overriding resources only overrides signals up to their power capacity. Therefore, while the bandwidth of the resource is 10 units, the sum of the powers of the signals within the selected frequency band may exceed 10 units, and not all of the signals within the bandwidth will be overridden. At those center-frequencies, the first EM resource covers signals S7-S9. The second EM resource covers signals S12-S15. The third EM resource covers signals S23-S28.

Referring now to FIG. 7, the EM resource center-frequencies which maximize a selected fitness function are 24.0, 37.9 and 81.6. The fitness function was selected to optimize simulated receiver resources. It is the sum of the priorities of signals within the bandwidths of the three resources. The fitness function is constrained by the bandwidth of the resources, which are permitted to overlap and each are limited to a power value of 10. The frequency band covered by the receiver resources is 10 units. At those center-frequencies, the first EM resource receives signals S7-S9, whose combined power is 8.39 units and whose frequency range is 7.2 units. Shifting the center-frequency in either direction to encompass signal S6 or signal S10 would increase the power value to 10.0 or 12.0 units, respectively, which would exceed the resource constraints of 10 power units. A power constraint prevents overloading of the front end of the receiver. The second EM resource covers signals S12-S15 whose combined power is 9.18 units and whose frequency range is 8.5 units. Shifting the center-frequency in either direction to encompass signal S11 or signal S16 would increase the power requirement of the resource to 13.5 or 14.1 units, respectively. The third EM resource covers signals S22-S24 whose combined power is 9.45 units and whose frequency range is 5.25 units. The receiving fitness function shifted the center-frequency to limit the power received by the receiving resource as compared to the center-frequency of the third overriding resource. In contrast, the center-frequencies obtained by conducting an exhaustive search based on a greedy algorithm are 23.3, 36.3 and 81.4. In both cases, the center-frequencies allow the receiver resources to receive the same signals. However, the exhaustive search required 1 hour, 56 minutes, 41 seconds and 998 milliseconds to find a solution while the swarm algorithm reached the same result in 187 milliseconds.

In a further embodiment, the PSO algorithm iterates until the maximum number of iterations is reached. In yet another embodiment, the PSO algorithm presents possible solutions, and a user may select a solution for implementation which is not necessarily the best solution. A user may choose a solution based on the user's knowledge which may not be represented in the system's constraints. Where the algorithm performs a predetermined number of iterations, which may result in an optimal solution being found before the last iteration, the algorithm may present a plurality of solutions after the last iteration (which include degrees of fitness and may include an optimal solution), give a user time to select a solution, and after the given time select the best solution or the optimal solution if one exists. In a further embodiment, in the case where the PSO algorithm iterates until it finds an optimal solution, a number of events may be defined to cause the algorithm to pause and enable a user to select a solution. One event may be a predetermined time limit measured from receipt of the last spectrum scan. Receipt of a predetermined signal may trigger another event.

Figure 8:
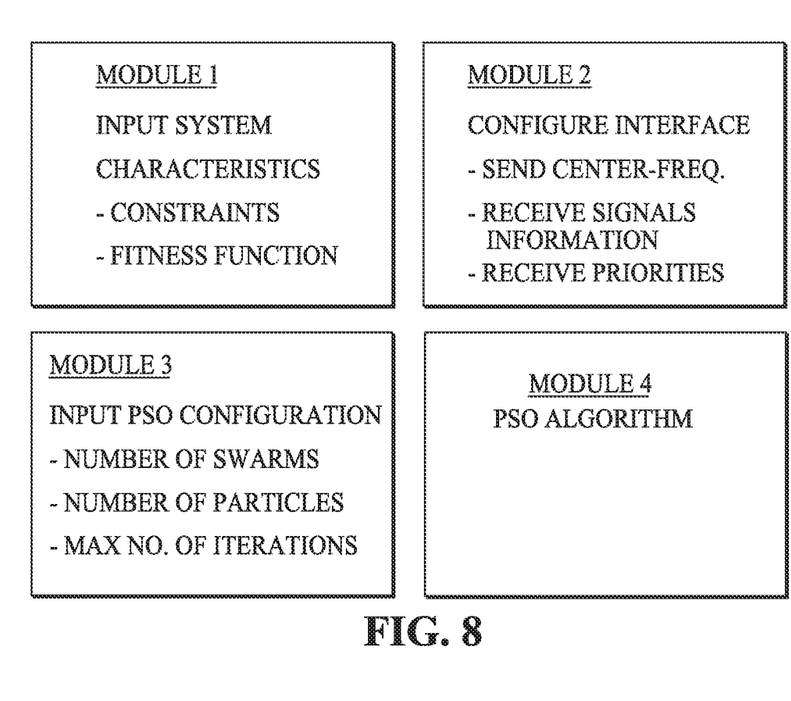
FIG. 8 is a block diagram depiction of software modules to implement a gaming particle swarm algorithm in the EM systems depicted in FIGS. 1 and 2.

FIG. 8 is a block diagram depiction of software modules to implement a gaming PSO algorithm in the EM systems depicted in FIGS. 1 and 2. Operation of the software will be described below with reference to FIG. 9. Returning to FIG. 9, the software comprises a plurality of modules. Although four modules are described, more or fewer modules may be provided. For example, additional modules may be provided to perform simulations or slow-speed representations of swarms as shown in FIG. 5. Such representations may be provided for pedagogical purposes, troubleshooting, study and analysis. Fewer modules may be provided in dedicated systems or by combining modules. Module 1 is provided to input system characteristics. In the exemplary EM system described above, system characteristics include constraints and a fitness function. Module 2 is provided to configure interfaces. Configuration entails matching protocols and interconnections to transmit and receive data over a data bus, for example, including center frequencies, signal information, and reception or override priorities. Module 3 is provided to configure the evolutionary algorithm, i.e. a swarm algorithm. Configuration may entail selecting a number of swarms, number of particles in a swarm, and the maximum number of iterations between solutions. Obviously other algorithms will have different configuration parameters and dedicated systems may be preconfigured and thus not required an algorithm configuration module. Module 4 comprises programs to execute the algorithm based on the configuration parameters. Each module may include programs for providing a user interface with which a user may configure the system.

Operation of a software program for implementing an embodiment of the method of assigning resources to targets will now be described with reference to FIG. 9. Initially, at steps 502 and 504, resource constraints and processing configurations are received by the system to define the boundaries of the system. The fitness function, algorithm type, number of iterations to perform, and any of the particular configuration parameters previously described are provided to select and define the operational boundaries of the algorithm. In a dedicated or integrated system, these parameters may be fixed and comprise firmware. In dynamic or decentralized systems, it may be desirable to enable the system to operate with resources of varying characteristics which may change over time.

At step 510, the program receives target information. Target information comprises the dynamic characteristics of the targets and any information concerning the targets which may be incorporated as a parameter of the fitness function. In the EM system, these characteristics comprise, for example, frequency, power, modulation, encoding weaknesses that may be exploited, and the like. This information typically changes between scans. Other target information, such as priorities, may also change although typically not as frequently. During the scanning cycle the system may check to determine whether new priority information is available. Dynamic characteristics may be provided in near real-time by the front-end subsystem. The other target characteristics may be provided to the back-end subsystem in any known manner for providing input to a system such as via an interface, communications link and the like.

At step 520, an evolutionary algorithm identifies potential solutions. A swarm algorithm is described with reference to step 520 although it is envisioned that other evolutionary algorithms will work. Step 540 comprises the same steps as those included within step 520 and is shown to illustrate operation of a gaming system where independent processes compete to arrive at potential solutions. Referring again to step 520, the swarm algorithm, which may be incorporated in the program or called by it, determines new gbest values. At step 522, the algorithm is initialized, for example with random particle positions. At step 524, fitness values are calculated based on the new positions. At steps 526 and 528 pbest and gbest values are updated based on the fitness values of the particles in the swarm or in neighborhoods of the swarm (e.g. equivalent to sub-swarms if multiple layers of subgroups are desired). The previous and current pbest values of a particle are compared to determine the pbest value of the particle going forward. In this manner the particle always selects the pbest value with the best fitness value after each iteration. The overall best pbest value is the gbest value. At steps 530 and 532 the velocities and locations of particles are updated according to formulas (1) and (2) and then the algorithm is ready to iterate again if necessary.

At step 534, the program determines if criteria for providing a solution have been met. There are many types of suitable criteria. If only one swarm algorithm is used, a criterion may comprise achieving a particular or predetermined fitness value. The predetermined value may be, for example, a value which experience shows is sufficient even if not optimal. Another criterion comprises reaching a predetermined number of iterations. The two criteria may also be combined, for example in a table, where a "good enough" value satisfies the criteria if a predetermined number of iterations is exceeded. The predetermined values may be chosen to accelerate the responsiveness of the system to reduce processing steps. Similarly, swarm and neighborhood sizes, and the number of swarms, are selected to minimize the number of processing steps required to reach a solution. For example, adding a competing swarm doubles the number of processing steps if the swarm sizes are maintained. However, adding a second swarm while reducing the swarm size by more than 50% reduces processing steps by reducing the overall number of particles for which pbest values must be calculated.

Figure 9:
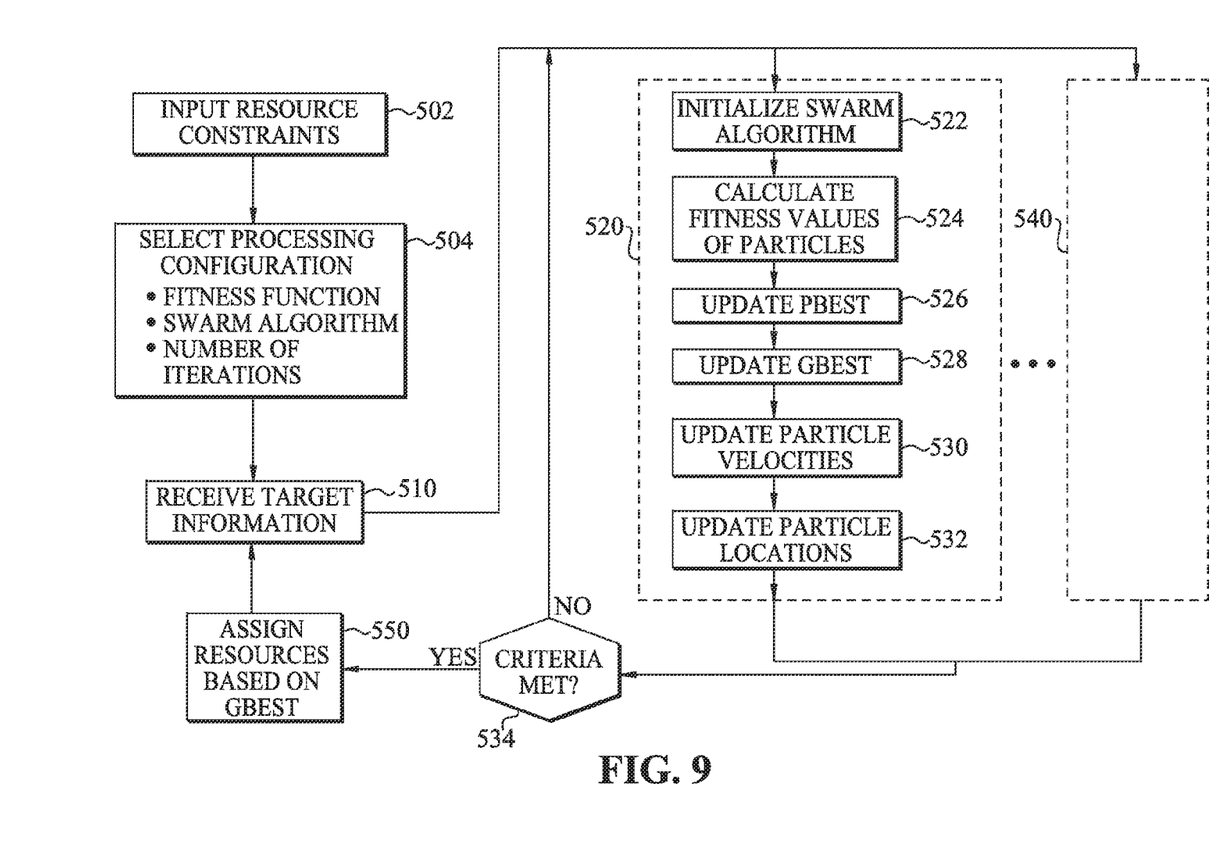
FIG. 9 is a flowchart of a method for assigning resources to targets based on a particle swarm algorithm.

In the case of a gaming PSO algorithm, steps 520 and 540 may be performed in parallel, as shown in FIG. 9, or sequentially. At step 534, the updated gbest values may be compared after each iteration to determine convergence. Alternatively, in another embodiment a number of iterations may be performed based on predetermined criteria such as criteria described above with respect to a single swarm, and only when the predetermined criteria are met are gbest values compared to determine convergence between the competing swarms. Such comparison comprises a second predetermined criterion. In one embodiment of a gaming PSO algorithm, convergence is evidenced by equal or equivalent fitness values. Any of the gbest values may be chosen if the fitness values are equal. Alternatively, a third criterion may be applied based on system constraints, fitness criteria or other rules. For example, in the case of three transceivers, where the gbest value determines center-frequencies, and the center-frequencies determine the maximum power of the signals, or targets, received or overridden by the transceiver, each receiver acting on a maximum power value of the combined signals it acts on, and one of the receivers acting on a maximum power value that is highest, the gbest value which minimizes the highest maximum power value may be chosen. Other criteria may similarly be based on priorities etc., essentially choosing gbest values based on predefined rules. Of course, in the unlikely event that the gaming PSO swarms do not reach convergence within a number of iterations, a circuit-breaker rule may be applied by which the best gbest value at the time the circuit-breaker stops processing is the selected gbest. If more than two swarms are used, then the criteria may be met when a majority of the swarms reach the same fitness value.

Once criteria have been met at step 534, in the following step, step 550, resources are assigned based on the selected gbest. After assigning resources, the program re-cycles at step 510 to process a new set of target information. The program may recycle as fast as the new target information is received, or may recycle automatically and re-process the prior set of target information. In the event that the assignment of resources was based on the number of iterations being met, which indicates a sub-optimal solution, recycling with the prior set of target information enables re-generation of the assignments.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A storage medium operable by a processing device to dynamically assign a plurality of resources to a plurality of targets, the storage medium comprising:

a first processing sequence to receive target information representing characteristics of the plurality of targets and to store the information in the storage medium;

a data structure comprising a plurality of particle data corresponding to a particle population, each particle data including a velocity and a position of a particle of the particle population;

a second processing sequence updating the plurality of particle data according to a predetermined formula and generating a plurality of fitness values based on the information, the plurality of fitness values corresponding to a plurality of potential solutions;

a third processing sequence iteratively invoking the second processing sequence to improve the plurality of potential solutions by comparing fitness values in preceding and succeeding iterations;

a fourth processing sequence defining a decision criterion to select from the improved plurality of solutions a best solution which satisfies the decision criterion, the best solution from the improved plurality of solutions comprising assignments for the plurality of resources; and a fifth processing sequence to communicate the assignments to the plurality of resources when the storage medium is communicatively coupled to the processing device and the plurality of resources; and a sixth processing sequence to invoke the third processing sequence independently at least twice thereby generating at least a first best solution and a second best solution corresponding to a first particle population and a second particle population, wherein the fourth processing sequence selects an overall best solution from at least the first best solution and the second best solution, and wherein the first, second, third, fourth, fifth and sixth processing sequences are operable to receive the target information, select an overall best solution and communicate the assignments at least once each second.

2. A storage medium as in claim 1, wherein the plurality of resources are electromagnetic (EM) resources and the plurality of targets are signals, and the assignments comprise center-frequencies for the plurality of EM resources to enable the plurality of EM resources to receive or override the plurality of signals within the bandwidths of the plurality of EM resources.

3. A storage medium as in claim 2, wherein the target information comprises at least one of signal power, signal modulation, signal frequency, and signal priority.

4. A storage medium as in claim 1, wherein the decision criterion comprises one of a predetermined fitness value, a number of iterations, and a difference between successive fitness values of successive best solutions being within 5% of an average fitness value of the successive best solutions.

5. A storage medium operable by a processing device to dynamically assign a plurality of resources to a plurality of targets, and the storage medium comprising:
a first processing sequence to receive target information representing characteristics of the plurality of targets and to store the information in the storage medium;
a data structure comprising a plurality of particle data corresponding to a particle population, each particle data including a velocity and a position of a particle of the particle population;
a second processing sequence updating the plurality of particle data according to a predetermined formula and generating a plurality of fitness values based on the information, the plurality of fitness values corresponding to a plurality of potential solutions;
a third processing sequence iteratively invoking the second processing sequence to improve the plurality of potential solutions by comparing fitness values in preceding and succeeding iterations;
a fourth processing sequence defining a decision criterion to select from the improved plurality of solutions a best solution which satisfies the decision criterion, the best solution from the improved plurality of solutions comprising assignments for the plurality of resources; and
a fifth processing sequence to communicate the assignments to the plurality of resources when the storage medium is communicatively coupled to the processing device and the plurality of resources;
wherein the first, second, third, fourth and fifth processing sequences are operable to receive the target information, select a best solution and communicate the assignments at least once each second.

6. A storage medium as in claim 5, further including a seventh processing sequence configured to upload the second processing sequence defining the predetermined formula.

7. A storage medium as in claim 5, further including an eight processing sequence configured to select the second processing sequence defining the predetermined formula from a plurality of second processing sequences stored in the storage device.

8. A storage medium as in claim 5, further including a ninth processing sequence configured to enable a user to select a number of particle populations corresponding to the number of invocations of the third processing sequence by the sixth processing sequence.

9. A storage medium operable by a processing device to dynamically assign a plurality of resources to a plurality of targets, and the storage medium comprising:
a first processing sequence to receive target information representing characteristics of the plurality of targets and to store the information in the storage medium;
a data structure comprising a plurality of particle data corresponding to a particle population, each particle data including a velocity and a position of a particle of the particle population;
a second processing sequence updating the plurality of particle data according to a predetermined formula and generating a plurality of fitness values based on the information, the plurality of fitness values corresponding to a plurality of potential solutions;
a third processing sequence iteratively invoking the second processing sequence to improve the plurality of potential solutions by comparing fitness values in preceding and succeeding iterations;
a fourth processing sequence defining a decision criterion to select from the improved plurality of solutions a best solution which satisfies the decision criterion, the best solution from the improved plurality of solutions comprising assignments for the plurality of resources; and
a fifth processing sequence to communicate the assignments to the plurality of resources when the storage medium is communicatively coupled to the processing device and the plurality of resources;
wherein decision criterion comprises one of a predetermined fitness value, a number of iterations, and a difference between successive fitness values of successive best solutions being within 5% of an average fitness value of the successive best solutions.

10. A storage medium operable by a processing device to dynamically assign a plurality of resources to a plurality of targets, and the storage medium comprising:
a first processing sequence to receive target information representing characteristics of the plurality of targets and to store the information in the storage medium;
a data structure comprising a plurality of particle data corresponding to a particle population, each particle data including a velocity and a position of a particle of the particle population;
a second processing sequence updating the plurality of particle data according to a predetermined formula and generating a plurality of fitness values based on the information, the plurality of fitness values corresponding to a plurality of potential solutions;

a third processing sequence iteratively invoking the second processing sequence to improve the plurality of potential solutions by comparing fitness values in preceding and succeeding iterations;

a fourth processing sequence defining a decision criterion to select from the improved plurality of solutions a best solution which satisfies the decision criterion, the best solution from the improved plurality of solutions comprising assignments for the plurality of resources;

a fifth processing sequence to communicate the assignments to the plurality of resources when the storage medium is communicatively coupled to the processing device and the plurality of resources; and further comprising a sixth processing sequence to invoke the third processing sequence independently at least twice thereby generating at least a first best solution and a second best solution corresponding to a first particle population and a second particle population, and wherein the fourth processing sequence selects an overall best solution from at least the first best solution and the second best solution.

11. A storage medium as in claim 10, wherein the fourth processing sequence selects the overall best solution when at least the first best solution and the second best solution converge and otherwise returns control to the third processing sequence.

12. A storage medium as in claim 11, wherein the fourth processing sequence selects as the overall best solution whichever of the first best solution and the second best solution has the best fitness value.

13. A storage medium as in claim 10, wherein the fourth processing sequence selects the overall best solution when a majority of best solutions from a plurality of particle populations converge and otherwise returns control to the third processing sequence.

14. A method of manufacturing a component of a resource allocation system, the allocation system having a plurality of resources assignable to a plurality of targets, the method comprising the steps of:

storing in a storage device a first processing sequence to receive target information representing characteristics of the plurality of targets and to store the information in the storage medium;

storing in the storage device a data structure comprising a plurality of particle data corresponding to a particle population, each particle data including a velocity and a position of a particle of the particle population;

storing in the storage device a second processing sequence updating the plurality of particle data according to a predetermined formula and generating a plurality of fitness values based on the information, the plurality of fitness values corresponding to a plurality of potential solutions;

storing in the storage device a third processing sequence iteratively invoking the second processing sequence to improve the plurality of potential solutions by comparing fitness values in preceding and succeeding iterations;

storing in the storage device a fourth processing sequence defining a decision criterion to select from the improved plurality of solutions a best solution which satisfies the decision criterion, the best solution from the improved plurality of solutions comprising assignments for the plurality of resources; and storing in the storage device a fifth processing sequence to communicate the assignments to the plurality of resources when the storage medium is communicatively coupled to the processing device and the plurality of resources; and storing in the storage device a sixth processing sequence to invoke the third processing sequence independently at least twice thereby generating at least a first best solution and a second best solution corresponding to a first particle population and a second particle population, wherein the fourth processing sequence selects an overall best solution from at least the first best solution and the second best solution, and wherein the first, second, third, fourth and fifth processing sequences are operable to receive the target information, select a best solution and communicate the assignments at least once each second.

15. A method of manufacturing a component of a resource allocation system as in claim 14, wherein the plurality of resources are electromagnetic (EM) resources and the plurality of targets are signals, and the assignments comprise center-frequencies for the plurality of EM resources to enable the plurality of EM resources to receive or override the plurality of signals within the bandwidths of the plurality of EM resources.

16. A method of manufacturing a component of a resource allocation system as in claim 15, wherein the target information comprises at least one of signal power, signal modulation, signal frequency, and signal priority.

17. A method of manufacturing a component of a resource allocation system as in claim 14, wherein the decision criterion comprises one of a predetermined fitness value, a number of iterations, and a difference between successive fitness values of successive best solutions being within 5% of an average fitness value of the successive best solutions.

18. A method of manufacturing a component of a resource allocation system as in claim 14, wherein the decision criterion comprises one of a predetermined fitness value, a number of iterations, and a difference between successive fitness values of successive best solutions being within 5% of an average fitness value of the successive best solutions.

19. A resource allocation system configured to detect signals within an operational bandwidth and dynamically respond to the signals to meet operational objectives, the system comprising:

a plurality of EM resources, each of the plurality of EM resources including an antenna and at least one of a receiving portion and a transmitting portion for receiving or responding to the signals within an EM resource bandwidth at an assignable center-frequency;

a processing device communicatively coupled to the plurality of EM resources and receiving, at frequent intervals, information about the signals, the processing device including a storage device having a fitness function and an evolutionary algorithm stored therein, the fitness function representing the operational objectives and determining a fitness value of a potential solution based on the information about the signals, the evolutionary algorithm generating a plurality of potential solutions, iteratively improving the plurality of solutions by comparing fitness values in preceding and succeeding iterations, and selecting a best solution from the improved plurality of solutions based on a predetermined criterion, the best solution comprising center-frequencies for the plurality of EM resources, and the processing device communicating the center-frequencies comprised in the best solution to the plurality of EM resources to assign the EM resources to the signals.

20. A resource allocation system as in claim 19, wherein the predetermined criterion comprises one of completion of a predetermined number of iterations, achievement of a predetermined fitness value, and a difference in the fitness values of consecutive best potential solutions being less than a predetermined amount.

21. A resource allocation system as in claim 20, wherein the predetermined amount is within 5% of the iteration fitness value.

22. A resource allocation system as in claim 19, wherein at least one of the plurality of EM resources scans the operating bandwidth of the resource allocation system to detect the signals and communicates at least a portion of the information about the signals to the processing device.

23. A resource allocation system as in claim 19, wherein the information about the signals includes at least one of priority, modulation pattern, power, and frequency.

24. A resource allocation system as in claim 19, wherein each of the intervals comprises less than a second.

25. A resource allocation system as in claim 19, wherein the evolutionary algorithm is a particle swarm algorithm including a particle swarm population having a plurality of particles, each of the particles having a velocity and a location parameter operable to determine the fitness value of the particle and a potential solution of the plurality of solutions.

26. A resource allocation system as in claim 25, wherein the particle swarm algorithm is a gaming particle swarm algorithm including two or more particle swarm populations.

27. A resource allocation system as in claim 26, wherein the predetermined criterion comprises convergence of the two or more particle swarm populations on the best solution.

28. A resource allocation system as in claim 25, wherein particle swarm algorithm compares the best solution from each of the two or more particle swarm populations after each iteration, and the predetermined criterion is achieved when a majority of the best solutions after each iteration converge.

* * * * *